United States Patent [19]
Keller et al.

[11] 3,983,540
[45] Sept. 28, 1976

[54] RAPID BUS PRIORITY RESOLUTION

[75] Inventors: Harry Keller; Edward H. Forrester, both of Phoenix, Ariz.

[73] Assignee: Honeywell Inc., Minneapolis, Minn.

[22] Filed: Sept. 8, 1975

[21] Appl. No.: 611,439

[52] U.S. Cl. .......................................... 340/172.5
[51] Int. Cl.² ........................................ G06F 3/00
[58] Field of Search ............................... 340/172.5

[56] References Cited
UNITED STATES PATENTS

| | | | |
|---|---|---|---|
| 3,710,324 | 1/1973 | Cohen et al. | 340/172.5 |
| 3,800,287 | 3/1974 | Albright | 340/172.5 |
| 3,810,114 | 5/1974 | Yamada et al. | 340/172.5 |
| 3,813,651 | 5/1974 | Yamada | 340/172.5 |
| 3,815,099 | 6/1974 | Cohen et al. | 340/172.5 |
| 3,909,790 | 9/1975 | Shapiro et al. | 340/172.5 |

*Primary Examiner*—Raulfe B. Zache
*Attorney, Agent, or Firm*—Laurence J. Marhoefer; Lockwood D. Burton

[57] ABSTRACT

In a computer system wherein a number of peripheral devices contend with each other for access to a communication bus, a priority selection system is provided. The priority selection system includes priority address code setting means as a part of each of the peripheral devices. A contention bus is provided to which all of the peripheral devices are connected in parallel. Logic means are provided as a functional part of each of the peripheral devices. A logic means are responsive to the setting of the priority address codes to resolve the priority selection among the several contenders. With the logic means and the address code means being a part of the peripheral devices, the selection is independent of card cage slot position or of slot gaps. The system is also independent of the length of the communication bus.

8 Claims, 4 Drawing Figures

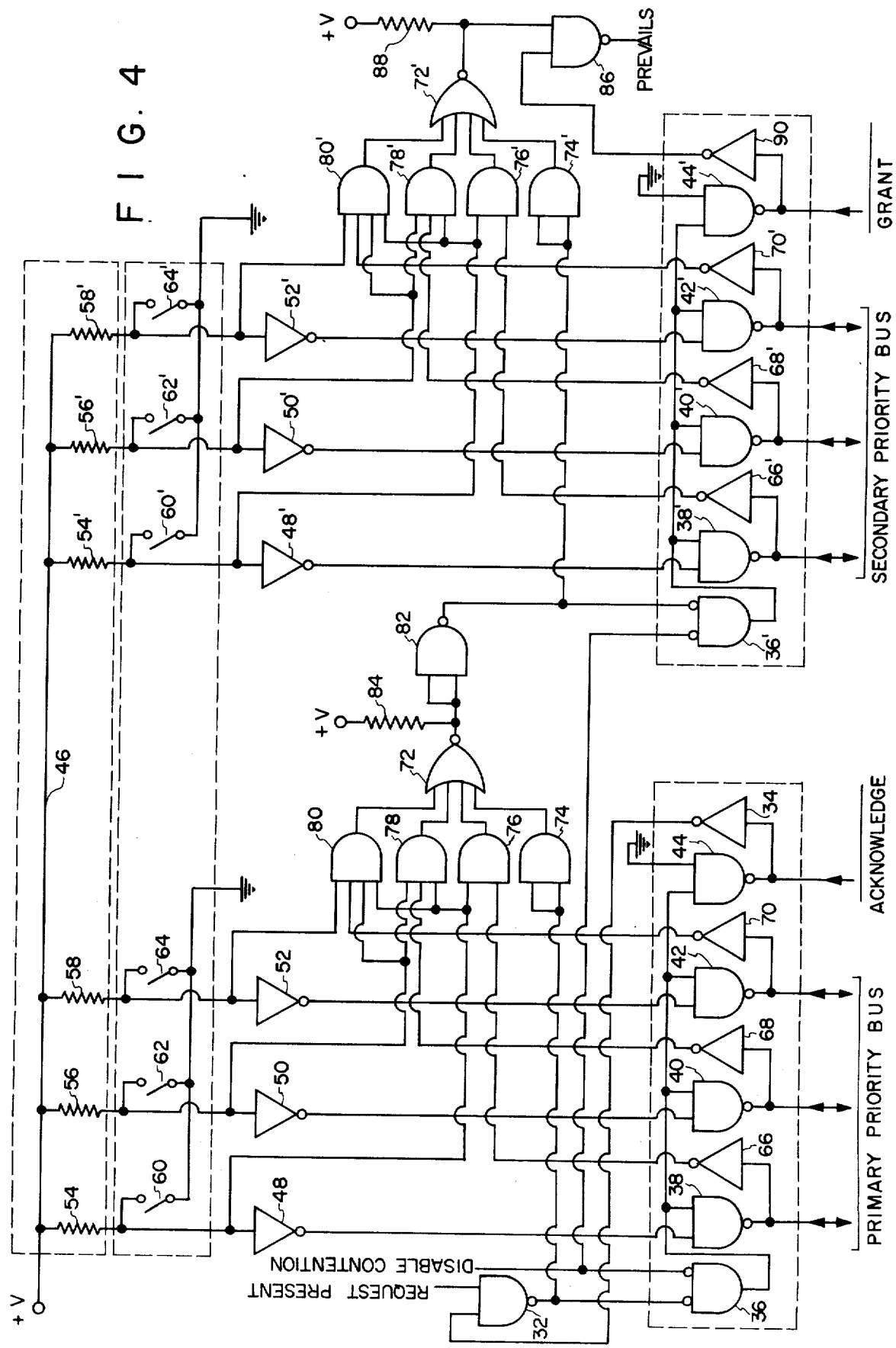

RAPID BUS PRIORITY RESOLUTION

BACKGROUND OF THE INVENTION

1. Field of the Invention

The present invention relates to a computer control system, and more particularly, to a rapid resolution priority determination among several contenders for a communication bus.

2. Description of the Prior Art

In the art relating to computer control system, and particularly to systems wherein industrial processes are controlled by a digital computer, the system usually includes a basic computer or central processor unit and a number of peripheral units. The peripheral units may include a plurality of process control stations for directly controlling a phase of the industrial process and/or responsive to measured process variables. Additionally, the peripheral units may include recorders or other memory devices, or data manipulating structure. All of these peripheral units must have access to the central processor at one time or another. Such access is usually accomplished by means of a communication bus which may include a number of groups of wire lines, one group being dedicated to address information, one group to intelligence information and others to control function information. In order that utter chaos does not prevail, means must be provided for controlling the access to the bus in accordance with a predetermined arrangement. Numerous schemes have been provided for effecting such control, exemplary of which is U.S. Pat. No. 3,886,524. Among the schemes provided for such control are polling schemes wherein the central processor polls the individual peripheral devices, in a predetermined sequence, to ascertain if any has a request for access to the bus. The central processor then grants access to the bus to one of the peripheral devices in accordance with a predetermined priority schedule.

In another type of scheme, a control signal is generated which is transmitted serially to the peripheral devices, wherein the order of priority is determined by the serial order of the devices along the serial string.

In the implementation of such computer systems, there is usually a separate buffer controller between each of the peripheral devices and the communication bus. These buffer controllers are usually on a circuit card inserted in predetermined slots in a card cage. In the first type of access control system, the address of a particular peripheral device is correlated with a predetermined one of the slots in the card cage. In other words, the central processor addresses a particular slot of the card cage to access a selected peripheral device.

In the second type of scheme referenced above, while the selecting address may well be on the individual card, the serial relationship imposes a restriction on the card slot arrangement. Since there is a requirement for the serial connection, the cards must be put into the slots in their priority order, beginning at the first slot with no gaps in the slots between the first and last card. In both of these schemes, considerable time is required for the procedure of actually accessing the selected peripheral device to the communication bus.

SUMMARY OF THE INVENTION

Accordingly, it is an object of the present invention to provide an improved priority resolution means for a communication bus.

It is another object of the present invention to provide an improved priority resolution means as set forth which is independent of slot position.

It is a further object of the present invention to provide an improved priority resolution means as set forth wherein one or more cards may be removed from the card cage without interrupting the operation of the system or interfering with the functioning of the priority selection along the bus.

It is yet another object of the present invention to provide an improved priority resolution means as set forth which is independent of the length of the communication bus.

It is a still further object of the present invention to provide, in a computer control system, a priority resolution means as set forth which is very rapid in carrying out the priority selection and granting of access of a peripheral device to the communication bus.

In accomplishing these and other objects, there has been provided, in accordance with the present invention, in a computer control system, a communication bus access priority resolution means wherein buffer controllers for all of the contending peripheral devices are connected both to the communication bus and to a priority control bus in completely parallel relation. The priority order for each of the contending peripherals is established by a set of selection switches; the switches for each peripheral are carried on the buffer controller card for the corresponding peripheral device; therefore, the priority selection is independent of slot position or slot gaps. A signal indicative of bus availability is sent down a control line of the priority control bus to a slight delay terminator. That signal is then returned to the central processor to trigger an access grant signal. Thus, the priority selection is independent of bus length.

BRIEF DESCRIPTION OF THE DRAWING

A better understanding of the present invention may be had from the following detailed description when read with reference to the accompanying drawings, in which:

FIG. 4 is a logic block diagram commensurate with the structure illustrated in FIG. 2.

DETAILED DESCRIPTION

Figure 1:
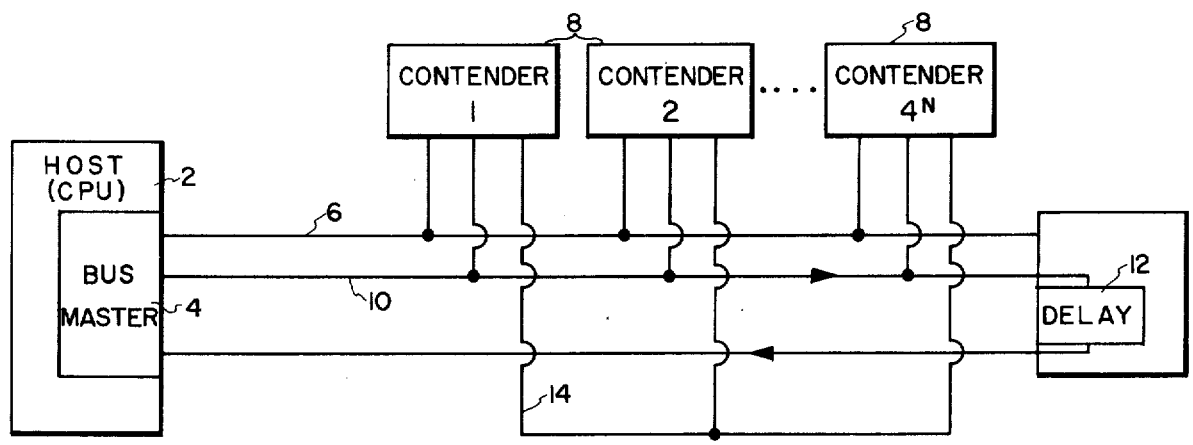
FIG. 1 is a general block diagram of a computer control system embodying the present invention.

Referring now to the drawings in more detail, there is shown in FIG. 1 a central processor unit 2 which includes a bus master controller 4. The bus master controller 4 has control of the operation of the communication input/output (I/O) bus 6. A plurality of contenders 8 represent any of a number of different kind of peripheral devices such as remote process controllers, either digital or analog; video input/output display, auxiliary memory means, various printers, card or tape punches or readers, and the like.

Each of the contenders 8 is connected, in parallel, to the I/O bus 6. As is customary, the I/O bus includes a number of groups of individual lines, such as address lines, I/O data lines, and control lines. Among the control lines, one carries an "attention" signal from any or all of the contenders signifying that at least one of the contenders requires access to the I/O bus. The bus master controller 4 responds to the "attention" signal by transmitting an "acknowledge" signal to all of the contenders 8, connected in parallel to the "acknowledge" line 10. The "acknowledge" line is commensurate with the I/O bus 6 and terminates in a delay device 12 that slightly delays the "acknowledge" signal at the bus terminator and returns the delayed "acknowledge" signal to the bus master controller 4 where that delayed signal triggers the transmission of an "access grant" signal. The line carrying the "access grant" signal is connected to all of the contenders 8 in parallel.

Each of the contenders 8 includes its own priority address as will be discussed in more detail hereinafter. The means establishing the priority address of each of the contenders 8 is preset and is entirely local with respect to the individual contender. During the transmission of the "acknowledge" signal, those contenders 8 which have a request for access to the bus present, establish substantially simultaneously, through the medium of a contention bus 14, again connected in parallel to all of the contenders, which of the contenders has the highest priority. That contender only is enabled to respond to the "access grant" signal. From this arrangement, it may be seen that the contention time is allowed to be dependent or the bus length; the "acknowledge" signal traversing the length of the bus and the delayed return thereof triggering the "grant" signal.

The general contention-resolution scheme comprising the present invention involves $4^N$ contenders. The priority address means of each contender includes 3N priority address switches. A requisite condition of the present scheme is that N be a nonzero integer and that, in each group of three switches, no more than one switch can be closed at any one time. In the embodiment illustrated in FIG. 2, it is assumed that N=2; accordingly, there will be a possible 16 contenders 8. Since, as noted above, for effective selection, there are 3N switches for each contender 8, for N=2, there will be six such switches. These switches include a first group of three or primary address switches 16 and a second group of three or secondary address switches 18. The two groups of switches may be actuated, within the limits of the constraints previously set forth herein to define octal based priority addresses in accordance with the following table:

| Priority Order | Priority Address |
| --- | --- |
| 1 | 3-3 |
| 2 | 3-5 |
| 3 | 3-6 |
| 4 | 3-7 |
| 5 | 5-3 |
| 6 | 5-5 |
| 7 | 5-6 |
| 8 | 5-7 |
| 9 | 6-3 |
| 10 | 6-5 |
| 11 | 6-6 |
| 12 | 6-7 |
| 13 | 7-3 |
| 14 | 7-5 |
| 15 | 7-6 |
| 16 | 7-7 |

Figure 2:
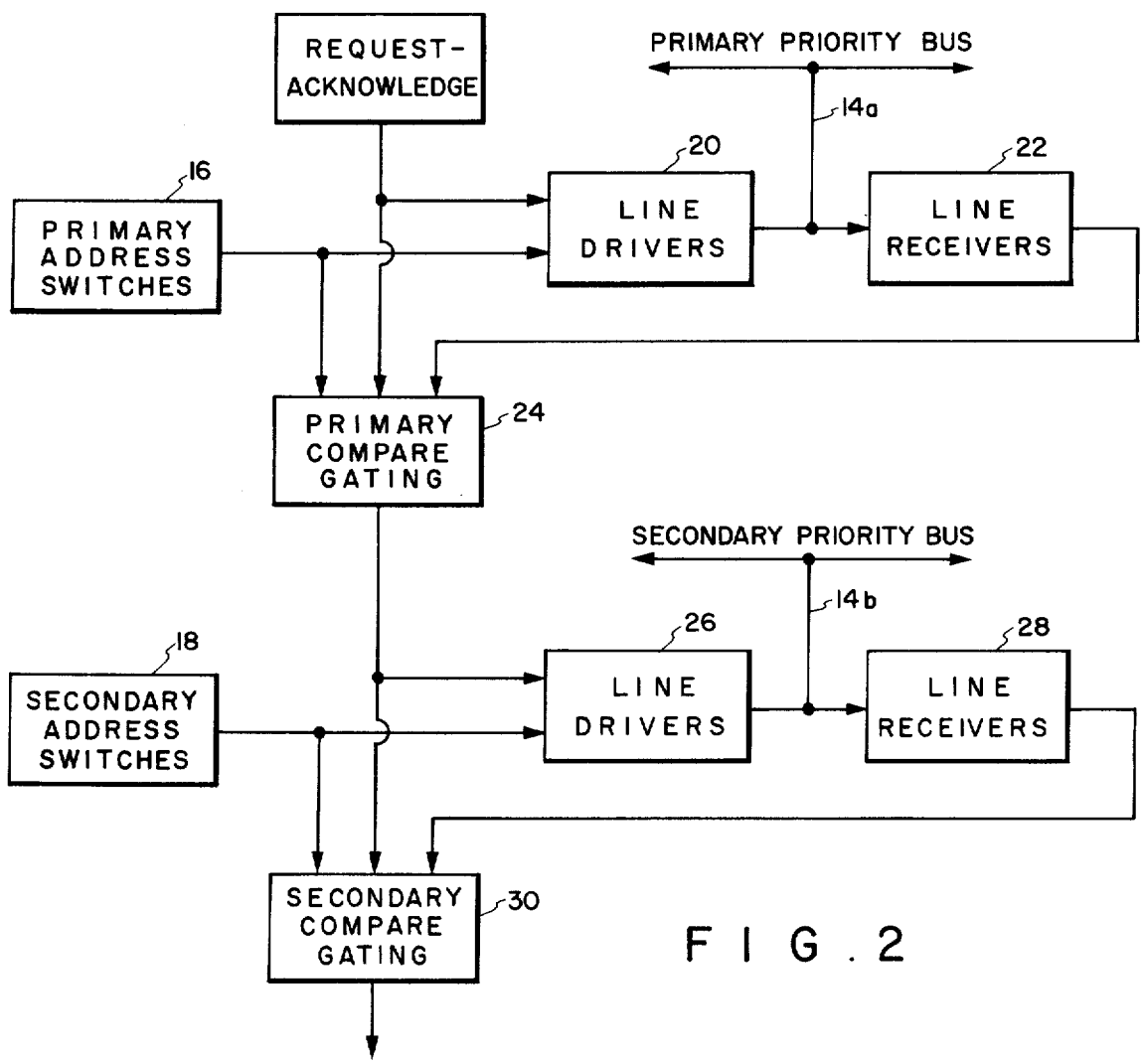
FIG. 2 is a functional block diagram of one of the contending peripherals and embodying the present invention in a special case.

In FIG. 2, the functional relationship of one of the contenders 8 is shown. When a request for access to the bus is present in the contender and the "acknowledge" signal has been transmitted by the bus master controller 4, a first signal is applied to a first set of three line drivers 20, one corresponding to each of the three primary address switches 16. Coincident signals from one of the primary address switches 16 and the "acknowledge" signal cause a signal to be applied by the corresponding one of the line drivers 20 to the corresponding individual line of the primary priority contention bus 14a. The output of the line drivers 20, hence the signals on the individual lines of the primary priority contention bus 14a, are applied as input signals to a corresponding first set of line receivers 22. The output signals of the line receivers 22 are applied as input signals to a primary comparator gate 24. Those signals are then compared with signals derived from the address switch means 16 and the "access request" signal to produce a signal indicative of having passed the primary priority selection. Of the 16 contenders 8, a maximum of four contenders can pass the primary test.

The signal from the primary comparator 24 becomes an "enable" signal for a secondary priority selection section. To that end, the output of the first comparator 24 is applied as input signal to each of a second set of three line drivers 26, one corresponding to each of the three secondary address switches 18. Coincident signals from one of the secondary switches 18 and the "enable" signal from the first comparator 24 cause a signal to be applied by the corresponding one of the line drivers 26 to the corresponding one of the individual lines of the secondary priority contention bus 14b. The output of the line drivers 26, hence the signals on the individual lines of the secondary priority contention bus 14b, are applied as input signals to a second set of corresponding line receivers 28. The output signals of the line receivers 28 are applied as input signals to a secondary comparator gate 30. Those signals are there compared with signals derived from the address switch means 18 and the "enable" signal from the first comparator 24 to produce a signal indicative that the particular contender 8 has passed the secondary priority selection. Of the possible four contenders 8 which passed the primary selection, only one can pass the secondary selection. Accordingly, the output signal from the secondary comparator gate 30 becomes an "enable" signal for the selected contender 8 to respond to an "access grant" signal from the bus master controller 4.

Figure 3:
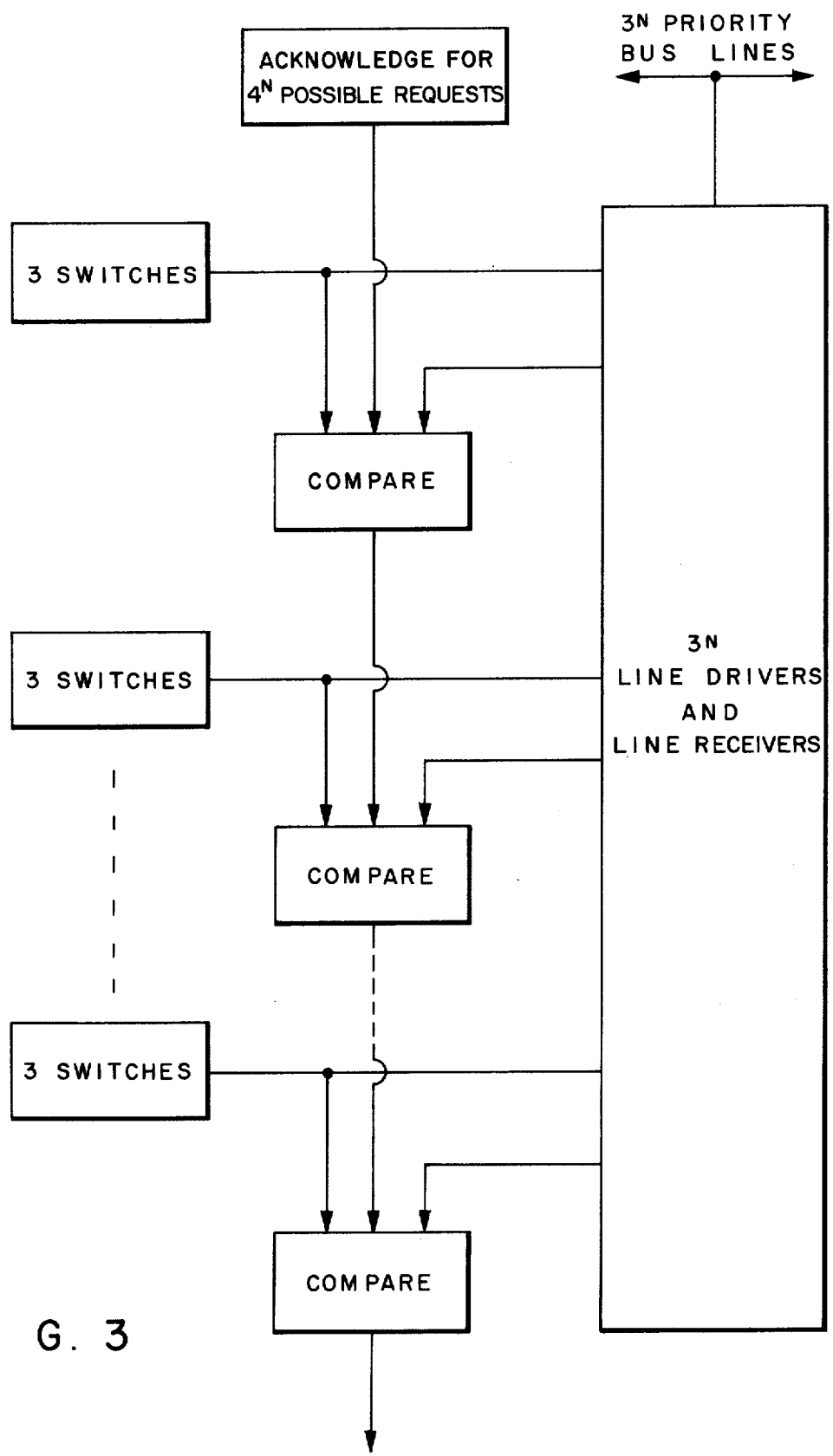
FIG. 3 is a functional block diagram of one of the contending peripherals and embodying the present invention in a general case.

A more generalized aspect of the present invention is illustrated in FIG. 3. There, a functional relationship of one of the contenders 8 of a possible $4^N$ contenders is shown. As previously mentioned, if there are $4^N$ contenders, then the selective addressing of each contender is accomplished by the presetting of 3N address switches.

Following the functional procedure discussed in connection with FIG. 2, the selection of those contenders at the first stage of contention is the same as in the primary contention stage of FIG. 2. The survivors of the first stage of contention will be no more than $4^{(N-1)}$ contenders. The output signal from the first stage comparator become "enable" signals for the next stage selection. Of the remaining contenders, no more than $4^{(N-2)}$ will be still in contention after the second stage of selection. Continuing that procedure, after the $N^{th}$ stage, there will be a single surviving contender. That contender, only, will be enabled to respond to the ultimate "grant" signal. Thus, the maximum number of contenders is limited, first, by the maximum number of devices desired in a given process system or, second, by the maximum amount of time to be allotted to the resolution of priority (although all of the contenders are connected in parallel), a finite time is consumed in successive stages of contention in each contender unit.

In FIG. 4 there is shown an assembly of logical units, comprising the selecting means of one contender, suitable for carrying out the invention in the embodiment illustrated in FIG. 2 wherein N=2. If the individual peripheral device exhibits a need for access to the 1/0 bus (FIG. 1), a "request" signal will be generated which is applied as one input signal to a NAND gate 32. The other input signal for the NAND gate 32 is derived from the "acknowledge" signal by way of a line receiver 34. The output terminal of the NAND gate 32 is connected to one input terminal of an AND gate 36, the output signal from which comprises an "enable" signal for a plurality of line drives 38, 40, 42 and 44.

A voltage source lead 46 is connected, in parallel to a first plurality of inverters 48, 50, 52 through respective load resistors 54, 56, 58. The junction between each of the load resistors and the associated inverter is selectively connected to ground by a switch 60, 62, 64, respectively. Those switches 60, 62, 64 comprise the primary address switches discussed in connection with FIG. 2. The output terminal of the inverter 48 is connected to the other input terminal of the line driver 38. Similarly, the output terminals of the inverters 50 and 52 are connected, respectively, to the input terminals of the line drivers 40 and 42. The output terminals of the three line drivers 38, 40, 42 are connected, respectively, to three lines of the primary priority bus 14a. The output terminals of the line drivers 38, 40, 42 are also connected, respectively, to three line receivers 66, 68, 70.

The primary comparator gate 24 (FIG. 2) includes four AND gates, the outputs of which are applied as input signals to a four terminal NOR gate 72. Of the four AND gates, the first one is a two-terminal gate 74, both input terminals of which are tied together and connected to the output terminal of the NAND gate 32. The second AND gate 76 is also a two-terminal gate with one terminal connected to the output terminal of the first line receiver 66. The other input terminal of the gate 76 is connected to a junction between the input of the inverter 48 and the switch 60. The third AND gate 78 is a three terminal gate with one input terminal connected to the output terminal of the second line receiver 68. A second input terminal of the gate 78 is connected, in common with the second terminal of the gate 76, to the output terminal of the inverter 48. The third input terminal of the gate 78 is connected to the input terminal of the inverter 50. The fourth AND gate 80 is a four terminal gate with one input terminal connected to the output terminal of the third line receiver 70. A second input terminal is connected, in common with the second input terminals of the gates 76 and 78, to the input terminal of the inverter 48; the third input terminal being connected, in common with the third input terminal of the gate 78, to the input terminal of the inverter 50. The fourth input terminal of the gate 80 is connected to the input terminal of the inverter 52. The output terminals of the AND gates 74, 76, 78, 80 are connected to the input terminals of the NOR gate 72. A NAND gate 82 has its two input terminals tied together and to a positive voltage supply through a load resistor 84 as well as to the output terminal of the NOR gate 72. All of the foregoing description of this FIG. 4 relates to the primary priority selection stage of one of the contenders.

The secondary priority selection stage is substantially identical to the primary stage. Elements of the secondary selection stage will, accordingly, be identified with the same reference numerals as the corresponding elements of the primary stage but with a prime superscript. The output signal from the NAND gate 82 is applied as input signal to an AND gate 36', the output signal from which comprises an enable signal for the line drivers 38', 40', 42' and 44'.

The voltage source lead 46 is also connected, in parallel, to a second plurality of inverters 48', 50', 52' through respective load resistors 54', 56', 58'. Again, the junction between each of the load resistors and the associated inverter is selectively connected to ground by a switch 60', 62', 64'. Those switches 60', 62', 64' comprise the secondary address switches. The output terminals of the inverters 58', 50' and 52' are connected, respectively, to the other input terminals of the line drivers 38', 40' and 42'. The output terminals of the line drivers 38', 40' and 42' are connected, respectively, to the individual lines of the secondary priority bus 14b. The output terminals of the line drivers 38', 40', 42' are also connected, respectively, to three line receivers 66', 68' and 70'.

The secondary comparator gate 30 (FIG. 2) also includes four AND gates, the outputs of which are applied as input signals to a four-terminal NOR gate 72'. Of the four AND gates, the first one is a two-terminal gate 74', with both input terminals tied together and connected to the output terminal of the NAND gate 82'. The second AND gate 76' is also a two-terminal gate with one terminal connected to the output terminal of the line receiver 66'. The other input terminal of the gate 76' is connected to the input terminal of the inverter 48'. The third AND gate 78' is a three-terminal gate with one input terminal connected to the output terminal of the line receiver 68'. A second input terminal of the gate 78' is connected, in common with the second terminal of the gate 76', to the input terminal of the inverter 48'. The third input terminal of the gate 78' is connected to the input terminal of the inverter 50'. The fourth AND gate 80' is a four terminal gate with one input terminal connected to the output terminal of the line receiver 70'. A second input terminal of the gate 80' is connected, in common with the second input terminals of the gates 76' and 78', to the input terminal of the inverter 48'; the third input terminal being connected, in common with the third input terminal of the gate 78', to the input terminal of the inverter 50'. The fourth input terminal of the gate 80' is connected to the input terminal of the inverter 52'. The output terminals of the AND gates 74', 76', 78' and 80' are connected to the input terminals of the NOR gate 72'.

An access control NAND gate 86 has one input terminal connected to the output terminal of the NOR gate 72' and, through a load resistor 88, to a positive voltage supply. The other input terminal of the gate 86 is connected to the output terminal of a line receiver 90, the input signal to which is a "grant" signal from the CPU2. The output of the line driver 44' is also connected to the input of the receiver 90. The output signal of the access control gate 86 is a signal indicative of the granting or not granting of bus access to the individual contender.

In operation, let it be assumed that a request for access signal is present in the contender illustrated in FIG. 4. When an "acknowledge" signal, a logical "0", is received by the receiver 34, a logical "1" is applied to the input of the request gate 32 which, together with the "request" signal causes that gate 32 to change its output to a logical "0" or low state. That "low" applied as input signal to the enable gate 36, together with a "low" on the other input thereof, signifying the absence of a "disable" signal, produces a "high" or logical "1" at the output of the gate 36. That "high" is applied as an "enable" signal to one input terminal of each of the line drivers 38, 40 and 42.

For the purpose of illustration, let it be assumed that primary access address switch 62 is the one closed switch of the primary selection stage. Looking for the moment to the primary comparator gate network, it is seen that a logical "0" or "low" output signal from the gate 82 is needed in order for this contender to remain in contention for access to the 1/0 bus. Working backward through the comparator, a "low" output from the gate 82 requires a "high" output from the NOR gate 72. That, in turn, requires that all of the input signals to the NOR gate be also "low". A "high" signal on any one of the input terminals of the gate 72 will produce a "low" at the output thereof. In order to accomplish the "low" signal on all of the input lines to the NOR gate 72, there must be at least one "low" signal on each of the four AND gates 74, 76, 78 and 80.

With these requirements in view the selective function of the structure may be considered. The coincidence of a "request present" signal and an "acknowledge" signal produce a "low" signal as input to the AND gate 74. In accordance with the illustrative example, the address selector switch 60 is open. Therefore, a "high" signal is applied to the input of the inverter 48. That "high" is applied as one input signal to each of the three AND gates 76, 78 and 80. That "high" causes a "low" signal to be applied as input signal to the enabled line driver 38, which, in turn, produces a "high" output signal to its corresponding line of the primary priority bus and as input signal to the inverting line receiver 66. The "high" input to the receiver 66 produces a "low" input to the AND gate 76. With the address switch 62 closed, the input to the inverter is a "low" signal, the junction being grounded by closure of the switch 62. That "low" is applied as input signal to one lead of each of the AND gates 78 and 80. Thus, the initial condition for priority selection appears to have been satisfied in that a "low" signal has been applied to at least one input terminal of each of the four AND gates 74, 76, 78 and 80.

That successful contention, however, is contingent upon no other contender on the priority bus having a higher priority. Such higher priority would be established by the closure of the address selector switch 60 of another contender. If the switch 60 of one of the other contenders on the primary priority bus were closed, a "low" signal would be presented to the inverter 48, resoluting in a "high" signal being applied to the input of the corresponding line driver 38 producing a "low" signal on the corresponding lead of the primary priority bus. It will be noted that the conditions for contention will be satisfied at the comparator of that other contender. The "low" signal applied to the first primary priority contention bus lead will override the "high" signal sought to be injected by the illustrative contender. Therefore, a "low" signal will be presented to the input of the line receiver 66, producing a "high" at the input of the AND gate 76. Since the other input to the gate 76 is "high" by virtue of the open switch 60, a "high" will be presented to the input of the NOR gate 72, thus blocking the illustrative contender from further contention. The one "high" input to the NOR gate 72 produces a "low" output therefrom, resulting in a "high" input to the gate 74 thereby disabling the "enable" signal from being applied to the output gate 86.

If, on the other hand, no higher priority was asserted on the primary priority contention bus, the illustrative contender would be still in contention. The "low" output signal from the gate 82, is applied as input signal to the gate 74'. At the same time, that "low" is applied as an input signal to the "enable" gate 36'. In the absence of a "disable" signal, a "low" is also applied to the other input of the gate 36', thus enabling the line drivers 38', 40', 42'. The second stage of selection, from this point through to the output of the NOR gate 72' is identical to the operation of the corresponding elements of the first stage.

If, for purposes of illustration, it is assumed that the secondary address switch 64' is closed, it may be seen that a "high" signal is presented to the input of the inverters 48' and 50'. This, in turn, produces a "high" at the output of the line drivers 38' and 40'. These latter "highs" are translated into "low" signals by the receivers 66' and 68' for application to the input of the gates 76' and 78'. The closure of switch 64' produces a "low" signal at the input of the inverter 52' and to the input of the AND gate 80'. Thus, unless there is contention from a contender having higher priority on the secondary priority contention bus, the illustrative contender will have satisfied the requirements for contention. A "high" will be produced at the output of the NOR gate 72', which "high" enables the access control gate 86 for reception of and response to a "grant" signal received and translated by the grant line receiver 90.

If, on the other hand, there had been a higher priority contention, a "low" signal would have been presented to the input of one of the other of the line receivers 66' or 68'. That would, of course, present a "high" to the input of one or the other of AND gates 76' or 78', blocking the contention of the illustrative contender.

If, for some reason, there has been a decision to interrupt the contention of the various peripherals for access to the 1/0 bus, a "high" signal will be applied to the line indicated as "disable" contention. That "high" is applied to the AND gate 74, blocking the further contention through the primary comparator. That "high" is also applied as input to both enable gates 36 and 36', disabling all of the line drivers.

Thus, it may be seen that there has been provided, in accordance with the present invention, an improved priority resolution means for a communication bus, which is independent of slot position or slot gaps, which is independent of bus length, and which is very rapid in the priority resolution and the granting of access to the communication bus.

The embodiments of the invention in which an exclusive property or privilege is claimed are defined as follows:

1. In a computer system having a common communication bus for a plurality of contending devices all connected in parallel to said bus, a logic circuit means at each of said contending devices, said logic circuit means each including means for establishing a priority level, and access contention bus means connected in parallel to each of said logic circuit means, said logic circuit means being responsive to an external signal substantially simultaneously applied to each such logic circuit means to enable a selected one of said contending devices for access to said communication bus.

2. In a computer system having a common communication bus for a plurality of contending devices all connected in parallel to said bus, a logic circuit means at each of said contending devices, said logic circuit means including means for establishing a priority level, said last mentioned means including a plurality of switch members selectively settable in accordance with a predetermined octal address code, and access contention bus means connected in parallel to each of said logic circuit means, said logic circuit means being responsive to an external signal substantially simultaneously applied to each such logic circuit means to enable a selected one of said contending devices for access to said communication bus.

3. In a computer system having a central processor unit, a common communication bus, and a plurality of peripheral devices all connected in parallel to said communication bus, priority means for establishing priority of contention among said peripheral devices for access to said communication bus and thereby to said central processor unit, said priority means comprising:

a logic circuit means included as a part of each of said peripheral devices, each of said logic circuit means including a plurality of switch members, said switch members being selectively settable in accordance with a predetermined octal access priority code, and access contention bus means, said logic circuit means all being connected in parallel to said access contention bus means, said logic circuit means being responsive to a first signal from said central processor unit substantially simultaneously applied to each of said logic circuit means to enable one of said peripheral devices selected in accordance with said access priority code to be responsive to a second signal from said central processor unit to gain access to said communication bus.

4. The priority means as set forth in claim 3 wherein such of said peripheral devices as have need for access to said central processor through said communication bus contend with each other by way of said access contention bus means in accordance with the priority order established by the coded setting of said switch members.

5. The priority means set forth in claim 4 wherein a "request" signal is provided by each peripheral device which has need for access to said communication bus, and wherein each said logic circuit means is responsive to a substantial coincident application of said "request" signal and said first signal from said central processor to enable contention of individual ones of said peripheral devices.

6. The priority means set forth in claim 5 wherein there are $4^N$ peripheral devices potentially in contention for access to said communication bus where N is a non-zero integer, and wherein each logic circuit means includes 3N switch members.

7. In a computer system having a central processor unit, a common communication bus connected to said central processor unit and a plurality of peripheral devices all connected in parallel to said communication bus, priority means for establishing priority of contention among said peripheral devices for access to said communication bus and thereby to said central processor unit, said priority means comprising:

a logic circuit means included as part of each of said peripheral devices, each of said logic means including a primary and a secondary contention stage, said primary stage including a set of three switch members each being selectively settable to define a primary priority address code, a primary access contention bus means, gating means in each of said primary contention stages coupling all of said primary contention stages in parallel to said primary contention bus means, said gating means being responsive to the selective setting of said switch members, primary comparator means in said primary stage coupled to compare signals derived from the setting of said switches with signals on said primary contention bus derived from the setting of the primary stage switch members of the other contending peripheral devices, said secondary stage including a set of three switch members each being selectively settable to define a secondary priority address code, a secondary access contention bus means, further gating means in each of said secondary contention stages coupling all of said secondary contention stages in parallel to said secondary contention bus means, said further gating means being responsive to an enabling signal derived from said primary comparator means and to the selective setting of said switch members of said secondary stage, secondary comparator means in said secondary stage coupled to compare signals derived from the setting of said switches of said secondary stage with signals on said secondary contention bus derived from the setting of the secondary stage switch members of the other contending peripheral devices, and output access gating means coupled to be enabled by a signal derived from said secondary comparator means.

8. The priority means set forth in claim 7 wherein said gating means of said primary stage and said primary comparator means are enabled by a signal derived from a coincidence of an access request signal from the associated peripheral device and a control signal from said central processor unit.

* * * * *